US012017755B2

(12) United States Patent
Kerr et al.

(10) Patent No.: US 12,017,755 B2
(45) Date of Patent: Jun. 25, 2024

(54) CONTROLLING MOVEMENT OF LANDING GEAR OR LANDING GEAR BAY DOORS

(71) Applicant: AIRBUS OPERATIONS LIMITED, Bristol (GB)

(72) Inventors: Sean Kerr, Bristol (GB); David Marles, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 217 days.

(21) Appl. No.: 17/435,355

(22) PCT Filed: Jun. 23, 2020

(86) PCT No.: PCT/EP2020/067478
§ 371 (c)(1),
(2) Date: Aug. 31, 2021

(87) PCT Pub. No.: WO2020/260269
PCT Pub. Date: Dec. 30, 2020

(65) Prior Publication Data
US 2022/0135213 A1      May 5, 2022

(30) Foreign Application Priority Data
Jun. 27, 2019 (GB) ...................... 1909260

(51) Int. Cl.
*B64C 25/16*  (2006.01)
*B64C 25/26*  (2006.01)

(52) U.S. Cl.
CPC .............. *B64C 25/16* (2013.01); *B64C 25/26* (2013.01)

(58) Field of Classification Search
CPC ................................ B64C 25/26; B64C 25/16
See application file for complete search history.

(56) References Cited

U.S. PATENT DOCUMENTS

| 2,401,097 A | 5/1946 | Parilla et al. |
| 6,854,689 B1 | 2/2005 | Lindahl et al. |
| (Continued) | | |

FOREIGN PATENT DOCUMENTS

| CN | 1938190 A | 3/2007 |
| CN | 102414081 A | 4/2012 |
| (Continued) | | |

OTHER PUBLICATIONS

International Search Report and Written Opinion of the ISA for PCT/EP2020/067478, dated Oct. 5, 2020, 15 pages.
(Continued)

*Primary Examiner* — Brady W Frazier
*Assistant Examiner* — Shanna Danielle Glover
(74) *Attorney, Agent, or Firm* — Nixon & Vanderhye P.C.

(57) ABSTRACT

A method of operating a landing gear controller for an aircraft, including: the landing gear controller receiving one or more signals from at least one position sensor. The one or more signals indicate a position of one of a landing gear bay door and a landing gear when the landing gear bay door or the landing gear, respectively, is part way through a range of travel between two limits of travel. The method may also include the landing gear controller controlling movement of the other of the landing gear bay door and the landing gear on the basis of the one or more signals.

21 Claims, 4 Drawing Sheets

(56) References Cited

U.S. PATENT DOCUMENTS

| | | |
|---|---|---|
| 8,600,584 B2 | 12/2013 | Fervel et al. |
| 11,345,464 B2 | 5/2022 | Marles |
| 2006/0027706 A1 | 2/2006 | Lindahl et al. |
| 2009/0187293 A1 | 7/2009 | Trotter et al. |
| 2013/0026291 A1* | 1/2013 | Way ................ B64C 25/16 |
| | | 244/102 R |
| 2016/0362177 A1 | 12/2016 | Abarca Lopez et al. |
| 2017/0166323 A1 | 6/2017 | Dangler et al. |
| 2019/0152589 A1 | 5/2019 | Evans et al. |

FOREIGN PATENT DOCUMENTS

| | | |
|---|---|---|
| CN | 104648659 | 5/2015 |
| CN | 109131845 A | 1/2019 |
| EP | 3 702 272 A1 | 9/2020 |
| FR | 2 967 252 | 5/2012 |
| GB | 552557 | 4/1943 |
| GB | 2571541 | 9/2019 |
| WO | 2005/077757 | 8/2005 |

OTHER PUBLICATIONS

Chinese Office Action cited in Application No. 202080017905.3 mailed Mar. 13, 2024, 9 pages.

\* cited by examiner

CONTROLLING MOVEMENT OF LANDING GEAR OR LANDING GEAR BAY DOORS

RELATED APPLICATION

This application is the U.S. national phase of International Application PCT/EP2020/067478, filed Jun. 23, 2020, which designated the U.S. and claims priority to United Kingdom Patent Application GB 1909260.0 filed Jun. 27, 2019, the entire contents of each of which are hereby incorporated by reference.

TECHNICAL FIELD

The present invention relates to landing gear controllers for aircraft, and to methods of operating landing gear controllers for aircraft.

BACKGROUND

In some known aircraft, a landing gear is held in an extended position when the aircraft is on the ground and is stowed at a retracted position in a landing gear bay once the aircraft has taken off. Such stowage of the landing gear helps to reduce aircraft drag and noise and the risk of the landing gear being damaged in flight. The landing gear subsequently is extended to the extended position again before the aircraft lands. A landing gear bay door may at least partially cover the landing gear bay when closed, and may be openable to enable movement of the landing gear between the retracted position and the extended position. Movement of the landing gear and the landing gear bay door is typically controlled by a pilot using cockpit flight controls of the aircraft, such as a landing gear control lever.

SUMMARY

A first aspect of the present invention provides an aircraft system, comprising: a landing gear bay door system, having: a landing gear bay door, and a landing gear bay door movement system that is operable to move the landing gear bay door over a range of travel between a closed position and an open position, wherein the landing gear bay door at least partially covers a landing gear bay when in the closed position; a landing gear system, having: a landing gear, and a landing gear movement system that is operable to move the landing gear over a range of travel between an extended position and a retracted position, wherein the landing gear is at least partially positioned in the landing gear bay when in the retracted position; at least one position sensor configured to, when one of the landing gear bay door and the landing gear is part way through its range of travel, sense a position of a part of the landing gear bay door system or a part of the landing gear system, respectively, and to output one or more signals indicative of the position; and a landing gear controller that is communicably connected to the at least one position sensor and operably connected to the landing gear bay door movement system and to the landing gear movement system, wherein the landing gear controller is configured, in use, to: receive the one or more signals from the at least one position sensor, and on the basis of the one or more signals, control movement of the other of the landing gear bay door and the landing gear by controlling operation of the landing gear bay door movement system or the landing gear movement system, respectively.

Optionally, on the basis of the one or more signals, the landing gear controller is configured, in use, to vary a speed of movement of the other of the landing gear bay door and the landing gear by controlling operation of the landing gear bay door movement system or the landing gear movement system, respectively.

Optionally, the landing gear bay door movement system comprises one or more rate-controllable actuators that are operable to move the landing gear bay door over the range of travel between the closed position and the open position, and the landing gear movement system comprises one or more rate-controllable actuators that are operable to move the landing gear over the range of travel between the extended position and the retracted position; wherein, on the basis of the one or more signals, the landing gear controller is configured, in use, to vary the speed of movement of the other of the landing gear bay door and the landing gear by controlling an actuation rate of the one or more rate-controllable actuators of the landing gear bay door movement system or the landing gear movement system, respectively.

Optionally, the landing gear controller is configured, in use, to vary the speed of movement of the other of the landing gear bay door and the landing gear on the basis of a position or speed of movement of the one of the landing gear bay door and the landing gear.

Optionally, the at least one position sensor is configured, in use, to: continuously or repeatedly sense the position of the part of the landing gear bay door system or the part of the landing gear system, respectively, along a path; and continuously or repeatedly output one or more signals indicative of the position of the part of the landing gear bay door system or the part of the landing gear system, respectively, along the path; and the landing gear controller is configured, in use, to receive the one or more signals continuously or repeatedly output by the at least one position sensor.

Optionally, the landing gear controller is configured, in use, to: determine a speed of movement of the part of the landing gear bay door system or the part of the landing gear system, respectively, along the path, on the basis of the one or more signals continuously or repeatedly output by the at least one position sensor; and control the movement of the other of the landing gear bay door and the landing gear by controlling operation of the landing gear bay door movement system or the landing gear movement system, respectively, on the basis of the speed of movement determined.

Optionally, on the basis of the one or more signals, the landing gear controller is configured, in use, to initiate movement of the other of the landing gear bay door and the landing gear by controlling operation of the landing gear bay door movement system or the landing gear movement system, respectively.

Optionally, the at least one position sensor is configured to sense one or more of an angular position, a linear position, and a curvilinear position of the part of the landing gear bay door system or the part of the landing gear system, respectively.

Optionally, the at least one position sensor comprises one or more of: a variable differential transformer (such as a rotary variable differential transformer or a linear variable differential transformer); a potentiometer (such as a rotary potentiometer or a linear potentiometer), which may be a digital potentiometer; an optical sensor; and a laser position or displacement sensor.

Optionally, the part of the landing gear bay door system is the landing gear bay door, and the part of the landing gear system is the landing gear.

Optionally, the at least one position sensor comprises: a landing gear bay door system position sensor that is configured to, when the landing gear bay door is part way through its range of travel, sense the position of the part of the landing gear bay door system and to output one or more first signals indicative of the position of the part of the landing gear bay door system, and a landing gear system position sensor that is configured to, when the landing gear is part way through its range of travel, sense the position of the part of the landing gear system and to output one or more second signals indicative of the position of the part of the landing gear system; and the landing gear controller is configured, in use, to: receive the one or more first signals and the one or more second signals, determine a relative position of the landing gear bay door and the landing gear on the basis of the one or more first signals and the one or more second signals, and control the movement of the other of the landing gear bay door and the landing gear on the basis of the relative position determined.

Optionally, the aircraft system comprises a relative position sensor that is configured to sense a relative position of the landing gear bay door and the landing gear and to output one or more signals indicative of the relative position; and the landing gear controller is configured, in use, to: receive the one or more signals indicative of the relative position, and control the movement of the other of the landing gear bay door and the landing gear on the basis of the one or more signals indicative of the relative position.

Optionally, the landing gear controller is configured, in use, to: receive one or more additional signals, and control the movement of the other of the landing gear bay door and the landing gear on the basis of the one or more additional signals.

Optionally, the one or more additional signals are indicative of one or more of: a pitch of a landing gear bogie, a status of another landing gear and/or another landing gear bay door, a status of one or more aircraft engines, failure or a defect of an aircraft component or an aircraft system, and an aircraft crab angle.

A second aspect of the present invention provides a method of operating a landing gear controller for an aircraft, the method comprising the landing gear controller: receiving one or more signals from at least one position sensor, the one or more signals indicating a position of one of a landing gear bay door and a landing gear when the landing gear bay door or the landing gear, respectively, is part way through a range of travel between two limits of travel; and controlling movement of the other of the landing gear bay door and the landing gear on the basis of the one or more signals.

Optionally, the method comprises the landing gear controller: receiving one or more additional signals, and controlling the movement of the other of the landing gear bay door and the landing gear on the basis of the one or more additional signals.

Optionally, the one or more additional signals are indicative of one or more of: a pitch of a landing gear bogie, a status of another landing gear or another landing gear bay door, a status of one or more aircraft engines, failure or a defect of an aircraft component or an aircraft system, and an aircraft crab angle.

Optionally, the controlling movement comprises initiating movement of the other of the landing gear bay door and the landing gear while the one of the landing gear bay door and the landing gear is part way through the range of travel.

Optionally, the controlling movement comprises the landing gear controller varying a speed of movement of the other of the landing gear bay door and the landing gear on the basis of the one or more signals.

Optionally, the varying the speed of movement of the other of the landing gear bay door and the landing gear on the basis of the one or more signals comprises the landing gear controller controlling an actuation rate of one or more rate-controllable actuators of a landing gear bay door movement system or a landing gear movement system, respectively.

Optionally, the varying the speed of movement of the other of the landing gear bay door and the landing gear is on the basis of a position or speed of movement of the one of the landing gear bay door and the landing gear.

Optionally, the method comprises the landing gear controller receiving the one or more signals continuously or repeatedly from the at least one position sensor.

Optionally, the method comprises the landing gear controller determining a speed of movement of the landing gear bay door or the landing gear, respectively, along a path on the basis of the one or more signals continuously or repeatedly received from the at least one position sensor, and wherein the controlling movement comprises controlling the movement of the other of the landing gear bay door and the landing gear on the basis of the speed of movement determined.

Optionally, the at least one position sensor comprises: a landing gear bay door system position sensor that is configured to, when the landing gear bay door is part way through its range of travel, sense the position of the landing gear bay door and to output one or more first signals indicative of the position of the landing gear bay door, and a landing gear system position sensor that is configured to, when the landing gear is part way through its range of travel, sense the position of the landing gear and to output one or more second signals indicative of the position of the landing gear; and the receiving comprises receiving the one or more first signals and the one or more second signals, wherein the method comprises the landing gear controller determining a relative position of the landing gear bay door and the landing gear, on the basis of the one or more first signals and the one or more second signals, and wherein the controlling movement comprises controlling movement of the other of the landing gear bay door and the landing gear on the basis of the relative position determined.

Optionally, the method comprises the landing gear controller receiving one or more third signals indicative of a relative position of the landing gear bay door and the landing gear, and the controlling movement comprises controlling movement of the other of the landing gear bay door and the landing gear on the basis of the one or more third signals indicative of the relative position.

A third aspect of the present invention provides a non-transitory computer-readable storage medium storing instructions that, if executed by a processor of a landing gear controller of an aircraft, cause the processor to carry out the method according to the second aspect of the present invention.

A fourth aspect of the present invention provides a landing gear controller for an aircraft system, the landing gear controller comprising a processor configured to perform the method according to the second aspect of the present invention.

A fifth aspect of the present invention provides a landing gear controller for an aircraft, the landing gear controller comprising: a receiver configured to receive, from at least one position sensor of the aircraft system, one or more signals indicative of a position of one of a landing gear bay door and a landing gear, when the landing gear bay door or the landing gear, respectively, is part way between two limits of travel; a determiner configured to determine, on the basis of the one or more signals, one or more instructions for controlling movement of the other of the landing gear bay door and the landing gear; and a sender configured to send the one or more instructions to a movement system that is configured to move the other of the landing gear bay door and the landing gear.

Optionally, the receiver is configured to receive one or more additional signals, and the determiner is configured to determine the one or more instructions on the basis of the one or more additional signals.

Optionally, the one or more additional signals are indicative of one or more of: a pitch of a landing gear bogie, a status of another landing gear or another landing gear bay door, a status of one or more aircraft engines, failure or a defect of an aircraft component or an aircraft system, and an aircraft crab angle.

Optionally, the one or more instructions are for initiating movement of the other of the landing gear bay door and the landing gear while the one of the landing gear bay door and the landing gear is part way through the range of travel.

Optionally, the one or more instructions are for varying a speed of movement of the other of the landing gear bay door and the landing gear.

Optionally, the one or more instructions for varying the speed of movement of the other of the landing gear bay door and the landing gear comprise one or more instructions for controlling an actuation rate of one or more rate-controllable actuators of a landing gear bay door movement system or a landing gear movement system, respectively.

Optionally, the determiner is configured to determine the one or more instructions for varying the speed of movement of the other of the landing gear bay door and the landing gear on the basis of a position or speed of movement of the one of the landing gear bay door and the landing gear.

Optionally, the receiver is configured to receive one or more signals continuously or repeatedly from the at least one position sensor.

Optionally, the determiner is configured to determine a speed of movement of the one of the landing gear bay door and the landing gear along a path on the basis of the one or more signals continuously or repeatedly received from the at least one position sensor, and the determiner is configured to determine the one or more instructions on the basis of the speed of movement determined.

Optionally, the receiver is configured to receive one or more first signals indicative of a position of the landing gear bay door when the landing gear bay door is part way through its range of travel, and one or more second signals indicative of a position of the landing gear when the landing gear is part way through its range of travel; the determiner is configured to determine a relative position of the landing gear bay door and the landing gear on the basis of the one or more first signals and the one or more second signals, and the determiner is configured to determine the one or more instructions on the basis of the relative position determined.

Optionally, the receiver is configured to receive one or more signals indicative of a relative position of the landing gear bay door and the landing gear, and the determiner is configured to determine the one or more instructions on the basis of the one or more signals indicative of the relative position.

A sixth aspect of the present invention provides an aircraft, comprising the aircraft system according to the first aspect of the present invention, the non-transitory computer-readable storage medium according to the third aspect of the present invention, or the landing gear controller according to the fourth or fifth aspect of the present invention.

It is to be noted that, herein, phrases of the form "movement between A and B" cover movement from A to B and movement from B to A. In some examples, the movement is from A to B, and in other examples the movement is from B to A.

BRIEF DESCRIPTION OF THE DRAWINGS

Embodiments of the invention will now be described, by way of example only, with reference to the accompanying drawings, in which.

DETAILED DESCRIPTION

Figure 1:
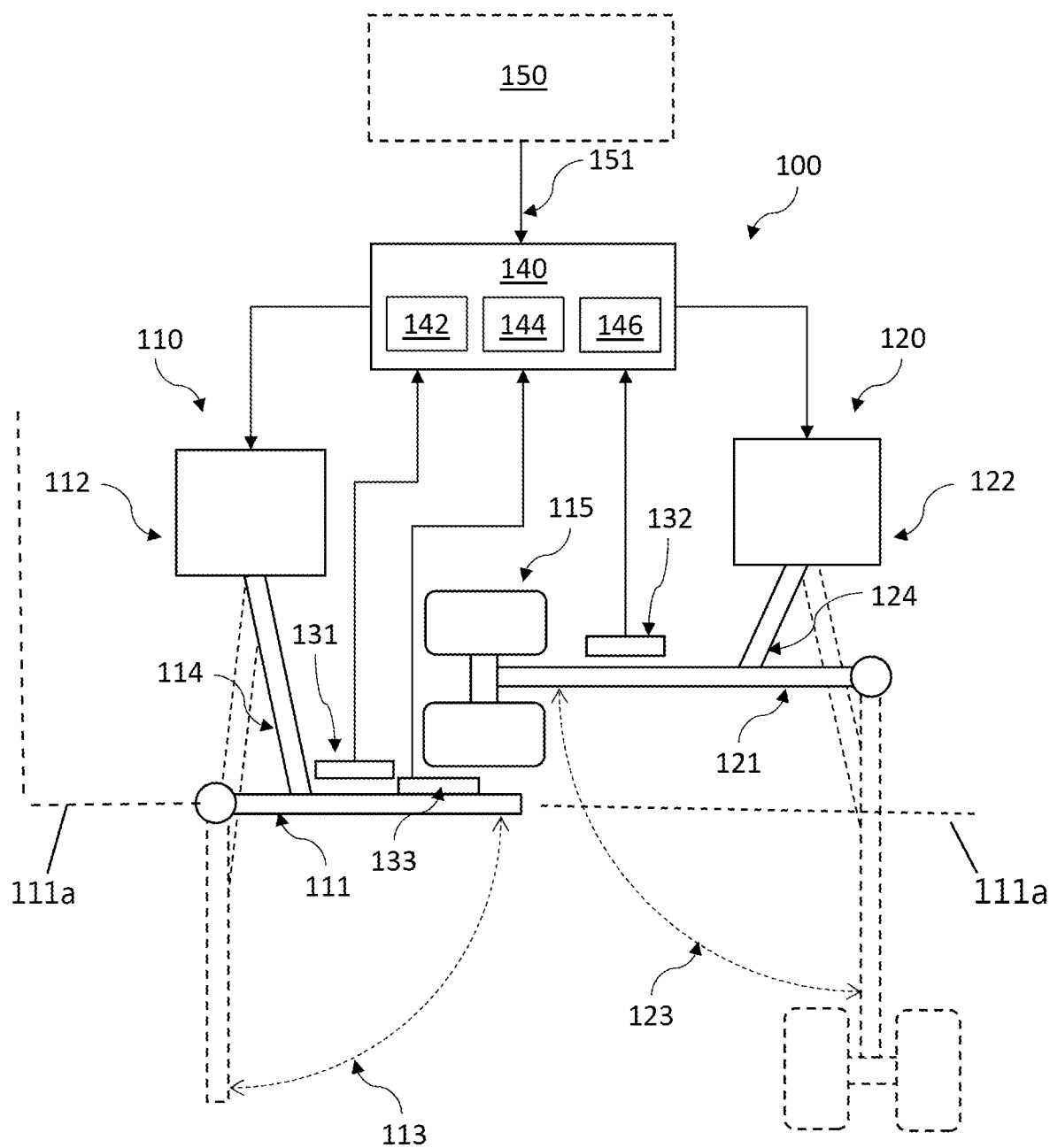
FIG. 1 shows a schematic view of an aircraft system.

Landing gear can influence aircraft performance. In the extended position, the landing gear may increase aircraft drag, which can reduce the climb rate of the aircraft during take-off, and may increase aircraft noise, which can be disturbing to people on the ground in the vicinity of the aircraft. Similar effects can result from a landing gear bay door being in an open position.

Typically, movements of each landing gear and associated landing gear bay door are initiated by a pilot manually operating cockpit flight controls, such as a landing gear control lever. Typically, operation of the cockpit flight controls causes one or more landing gear bay door actuators to drive movement of the landing gear bay door from a closed position to an open position, then one or more landing gear actuators to extend or retract the landing gear, and then the one or more landing gear bay door actuators to drive movement of the landing gear bay door from the open position to the closed position. This sequence is sequential in that the landing gear bay door must be fully open before the landing gear is extended or retracted, and the landing gear must be fully extended or retracted (and, usually, locked) before the landing gear bay door can be moved from the open position to the closed position. The sequencing typically is controlled on the basis of outputs from proximity sensors or switches, which detect when the landing gear bay door is fully open or closed and when the landing gear is fully extended or retracted.

During a take-off procedure, the pilot will typically manually initiate a landing gear retraction procedure upon confirming a positive rate of aircraft climb. Such confirmation may occur at about three seconds after take-off. Since the take-off procedure is one of the highest workload flight phases for flight crew, there is a tendency for retraction of landing gear to be delayed after take-off, in order to spread the various actions that the flight crew must perform during take-off over a greater period of time. Similarly, since the landing procedure is also one of the highest workload flight phases for flight crew, there is a tendency for extension of landing gear to be performed well before landing, in order to spread the various actions that the flight crew must perform during landing over a greater period of time.

Some examples discussed herein are concerned with enabling landing gear retraction to be completed sooner after take-off, in particular since this could help to reduce aircraft drag. In turn, this may enable an increased aircraft climb rate to help avoid obstacles on the ground and/or may allow an increase in maximum take-off weight of the aircraft for a given size of landing gear system, wing capability and engine thrust. Similarly, enabling landing gear retraction to be completed sooner in a take-off procedure can help to reduce the total aircraft noise caused during a take-off procedure, or at least reduce a period of time during which the aircraft is making increased noise due to extended landing gear.

Some examples discussed herein are concerned with enabling landing gear extension to occur closer to landing, in particular since this could help to reduce aircraft drag and noise, or at least reduce a period of time during which the aircraft is making increased noise due to extended landing gear.

Decreasing the time for which the landing gear is extended and the landing gear bay door is open can also reduce the risk of the landing gear or landing gear bay door being damaged, such as by buffeting by wind or hail, bird strike, or lightning strike. These and other advantages are achievable while maintaining that authority for retracting or extending the landing gear lies with the pilot or another human operator.

FIG. 1 shows a schematic view of an aircraft system according to an example. Broadly speaking, the aircraft system 100 comprises a landing gear bay door system 110, a landing gear system 120, plural position sensors 131, 132, 133 (which may be considered plural displacement sensors 131, 132, 133), and a landing gear controller 140. Each of these elements is described below in more detail.

The landing gear bay door system 110 comprises a landing gear bay door 111 and a landing gear bay door movement system 112. The landing gear bay door movement system 112 is operable to move the landing gear bay door 111 over a range of travel 113 between a closed position and an open position. The closed and open positions can be considered limits of travel of the landing gear bay door 111. In this example, the landing gear bay door 111 rotates about a pivot mounted to the landing gear bay 111a, wherein the landing gear bay door 111 pivots between the closed and open positions, but in other examples the landing gear bay door 111 may move in some other manner between the closed and open positions, such as a linear or curvilinear manner. In FIG. 1, the landing gear bay door 111 is depicted in the closed position using solid lines, and a "ghost" of the landing gear bay door 111 in the open position is depicted using dashed lines. The landing gear bay door 111 at least partially covers a landing gear bay 115 when in the closed position, as can be seen in FIG. 1.

The landing gear system 120 comprises a landing gear 121 and a landing gear movement system 122. The landing gear movement system 122 is operable to move the landing gear 121 over a range of travel 123 between an extended position and a retracted position. The extended and retracted positions can be considered limits of travel of the landing gear 121. In this example, the landing gear 121 rotates about a pivot between the extended and retracted positions, but in other examples the landing gear 121 may move in some other manner between the extended and retracted positions, such as a linear or curvilinear manner. In FIG. 1, the landing gear 121 is depicted in the retracted position using solid lines, and a "ghost" of the landing gear 121 in the extended position is depicted using dashed lines. The landing gear 121 is at least partially positioned in the landing gear bay 115 when in the retracted position, again as can be seen in FIG. 1.

The landing gear bay door 111 may be considered to be associated with the landing gear 121 and the landing gear bay 115. When the landing gear bay door 111 at least partially covers the landing gear bay 115 at the closed position, the landing gear bay door 111 helps to protect the landing gear bay 115, and the landing gear 121 when stowed in the bay 115, from debris that might be thrown towards the bay 115 while the aircraft is moving on the ground. Moreover, the closed landing gear bay door 111 aids aerodynamics when the aircraft is in flight, in that it helps to "clean up" the aircraft's exterior surfaces.

In this example, the landing gear bay door movement system 112 comprises one or more rate-controllable actuators 114 (only one is schematically depicted in FIG. 1, for clarity) that are operable to move the landing gear bay door 111 over the range of travel 113 between the closed position and the open position. The rate-controllable actuator(s) 114 may be pivotably and/or slidably coupled to the landing gear bay door 111. The rate-controllable actuator(s) 114 may be for moving the landing gear bay door 111 from the closed position to the open position, and from the open position to the closed position. Alternatively, one or more first rate-controllable actuators may be provided for moving the landing gear bay door 111 from the open position to the closed position, and one or more seconds rate-controllable actuators may be provided for moving the landing gear bay door 111 from the closed position to the open position. The, or each, rate-controllable actuator 114 may take any suitable form, such as a hydraulic actuator, an electro-hydraulic actuator, or an electric actuator.

Although not depicted in FIG. 1 for clarity, the aircraft system 100 may comprise one or more landing gear bay door locks for locking the landing gear bay door 111 in the closed position and/or one or more landing gear bay door locks for locking the landing gear bay door 111 in the open position. Each of the one or more landing gear bay door locks may take any suitable form, such as a hydraulically-actuated lock, an electro-hydraulically-actuated lock, or an electrically-actuated lock. In some cases, the one or more landing gear bay door locks may be omitted. For example, the landing gear bay door 111 may be held in the closed position by the one or more rate-controllable actuators 114.

The landing gear movement system 122 comprises one or more rate-controllable actuators 124 (only one is depicted in FIG. 1, for clarity) that are operable to move the landing gear 121 over the range of travel 123 between the extended position and the retracted position. The rate-controllable actuator(s) 124 may be pivotably and/or slidably coupled to the landing gear 121. The rate-controllable actuator(s) 124 may be for moving the landing gear 121 from the retracted position to the extended position, and from the extended position to the retracted position. Alternatively, one or more first rate-controllable actuators may be provided for moving the landing gear 121 from the retracted position to the extended position, and one or more second rate-controllable actuators may be provided for moving the landing gear bay door 111 from the extended position to the retracted position. The, or each, rate-controllable actuator 124 may take any suitable form, such as a hydraulic actuator, an electro-hydraulic actuator, or an electric actuator.

Power may be supplied to the landing gear bay door movement system 112 and the landing gear movement system 122 from a common (e.g. electrical or hydraulic) power supply. In other examples, the landing gear bay door movement system 112 and the landing gear movement system 122 may receive power from respective different (e.g. electrical or hydraulic) power supplies.

Although not depicted in FIG. 1 for clarity, the aircraft system 100 may comprise one or more landing gear locks for locking the landing gear 121 in the retracted position and/or one or more landing gear locks for locking the landing gear in the extended position. Typically, such landing gear locks are spring-actuated mechanical locks, which are unlocked by operation of an actuator. Each of the one or more landing gear locks may take any suitable form, such as a hydraulically-actuated lock, an electro-hydraulically-actuated lock, or an electrically-actuated lock. In some cases, the one or more landing gear locks may be omitted. For example, the landing gear 121 may be held in the retracted position by the one or more rate-controllable actuators 124.

A first position sensor 131 of the plural position sensors is a landing gear bay door system position sensor. The first position sensor 131 is configured to, when the landing gear bay door 111 is part way through its range of travel 113, sense a position of a part of the landing gear bay door system 110 and to output one or more first signals indicative of the position. The position may be a position of the part of the landing gear bay door system 110 relative to the landing gear bay 115, for example, or another part of the aircraft that may be fixed relative to the landing gear bay 115. In this example, the part of the landing gear bay door system 110 is the landing gear bay door 111 itself. In other examples, the part of the landing gear bay door system 110 may, for example, be a portion of the one or more rate-controllable actuators 114. In this example, the first position sensor 131 is fixed in or relative to the landing gear bay 115 and is configured to sense the position of the part of the landing gear bay door system 110 (in this example, the landing gear bay door 111) relative to the first position sensor 131. In other examples, the first position sensor 131 may, for example, be mounted on the part of the landing gear bay door system 110, such as on the landing gear bay door 111, and be configured to sense the position of the part of the landing gear bay door system 110 relative to the landing gear bay 115 or another part of the aircraft that may be fixed relative to the landing gear bay 115.

In some examples, the first position sensor 131 may be configured, in use, to continuously or repeatedly sense the position of the part of the landing gear bay door system 110, and to continuously or repeatedly output one or more first signals indicative of the position of the part of the landing gear bay door system 110. The landing gear controller 140 is communicably connected (by a wired or wireless connection) to the first position sensor 131 and is configured in use to receive the one or more first signals from the first position sensor 131, such as the one or more first signals continuously or repeatedly output by the first position sensor 131.

A second position sensor 132 of the plural position sensors is a landing gear system position sensor. The second position sensor 132 is configured to, when the landing gear 121 is part way through its range of travel 123, sense a position of a part of the landing gear system 120 and to output one or more second signals indicative of the position. The position may be a position of the part of the landing gear system 120 relative to the landing gear bay 115, for example, or another part of the aircraft that may be fixed relative to the landing gear bay 115. In this example, the part of the landing gear system 120 is the landing gear 121 itself. In other examples, the part of the landing gear system 120 may, for example, be a portion of the one or more rate-controllable actuators 124. In this example, the second position sensor 132 is fixed in or relative to the landing gear bay 115 and is configured to sense the position of the part of the landing gear system 120 (in this example, the landing gear 121) relative to the second position sensor 132. In other examples, the second position sensor 132 may, for example, be mounted on the part of the landing gear system 120, such as on the landing gear 121, and be configured to sense the position of the part of the landing gear system 120 relative to the landing gear bay 115 or another part of the aircraft that may be fixed relative to the landing gear bay 115.

In some examples, the second position sensor 132 may be configured, in use, to continuously or repeatedly sense the position of the part of the landing gear system 120, and to continuously or repeatedly output one or more second signals indicative of the position of the part of the landing gear system 120. The landing gear controller 140 is communicably connected (by a wired or wireless connection) to the second position sensor 132 and is configured in use to receive the one or more second signals from the second position sensor 132, such as the one or more second signals continuously or repeatedly output by the second position sensor 132.

Each of the first and second position sensors 131, 132 may be configured to sense one or more of an angular position, a linear position, and a curvilinear position of the part of the landing gear bay door system 110 or the part of the landing gear system 120, respectively.

A third position sensor 133 of the plural position sensors is a relative position sensor that is configured to sense a relative position of the landing gear bay door 111 and the landing gear 121 and to output one or more third signals indicative of the relative position. The third position sensor 133 is configured to sense the relative position and to output the one or more third signals indicative of the relative position, when the landing gear bay door 111 is part way through its range of travel 113 and/or when the landing gear 121 is part way through its range of travel 123. In this example, the third position sensor 133 is mounted on the landing gear bay door 111 and is configured to sense the position of the landing gear 121 relative to the third position sensor 133. In other examples, the third position sensor 133 may, for example, be mounted on the landing gear 121 and be configured to sense the position of the landing gear bay door 111 relative to the third position sensor 133.

In some examples, the third position sensor 133 may be configured, in use, to continuously or repeatedly sense the relative position of the landing gear bay door 111 and the landing gear 121, and continuously or repeatedly output one or more third signals indicative of the relative position. The landing gear controller 140 is communicably connected (by a wired or wireless connection) to the third position sensor 133 and is configured in use to receive the one or more third signals from the third position sensor 133, such as the one or more third signals continuously or repeatedly output by the relative position sensor 133.

It is to be noted that, in some examples, the plural position sensors 131, 132, 133 are not proximity sensors (also known as proximity switches). Proximity sensors determine the presence or absence of an object in a particular location and produce a simple digital, or on/off, output accordingly. Examples of proximity sensors are Hall effect sensors, microswitches, and laser systems that are configured to sense the presence of an object by way of a path between a laser emitter and a receiver being interrupted. In contrast, each of the plural position sensors 131, 132, 133 (or displacement sensors 131, 132, 133) is configured to make a true measurement of position or displacement and to output a signal representative of that measurement. Each of the signals output by one of the plural position sensors 131, 132, 133 may be proportional to a position, of the part being sensed, relative to the sensor 131, 132, 133 and/or along a path. Knowing the actual position of the landing gear bay door 111 and the landing gear 121 can also facilitate troubleshooting.

Each of the first, second and third position sensors 131, 132, 133 may, for example, comprise one or more of: a variable differential transformer (such as a rotary variable differential transformer or a linear variable differential transformer); a potentiometer (such as a rotary potentiometer or a linear potentiometer), which may be a digital potentiometer; an optical sensor; and a laser position or displacement sensor. Other suitable types of position sensor will be apparent to the skilled person.

The landing gear controller 140 is operably connected to the landing gear bay door movement system 112 and to the landing gear movement system 122. The landing gear controller 140 is configured, in use, to receive the one or more first signals from the first position sensor 131, and, on the basis of the one or more first signals, control movement of the landing gear 121 by controlling operation of the landing gear movement system 122. Accordingly, the landing gear controller 140 controls movement of the landing gear 121 based on one or more received indications of the position of the landing gear bay door 111 while the landing gear bay door 111 is at a location between the open and closed positions. In some examples, the landing gear controller 140 initiates, or causes the commencement of, movement of the landing gear 121 on the basis of the one or more first signals received from the first position sensor 131.

In this example, the landing gear controller 140 also is configured, in use, to receive the one or more second signals from the second position sensor 132, and, on the basis of the one or more second signals, control movement of the landing gear bay door 111 by controlling operation of the landing gear bay door movement system 112. Accordingly, the landing gear controller 140 controls movement of the landing gear bay door 111 based on one or more received indications of the position of the landing gear 121 while the landing gear 121 is at a location between the retracted and extended positions. In some examples, the landing gear controller 140 initiates, or causes the commencement of, movement of the landing gear bay door 111 on the basis of the one or more second signals received from the second position sensor 132.

In some examples, the first position sensor 131 may be omitted, and the landing gear controller 140 may not be configured to control movement of the landing gear 121 based on one or more received indications of the position of the landing gear bay door 111 while the landing gear bay door 111 is at a location between the open and closed positions. In some such examples, the landing gear controller 140 may still be configured to receive the one or more second signals from the second position sensor 132, and, on the basis of the one or more second signals, control movement of the landing gear bay door 111 by controlling operation of the landing gear bay door movement system 112. In some such examples, the third position sensor 133 may also be omitted.

In some examples, the second position sensor 132 may be omitted, and the landing gear controller 140 may not be configured to control movement of the landing gear bay door 111 based on one or more received indications of the position of the landing gear 121 while the landing gear 121 is at a location between the extended and retracted positions. In some such examples, the landing gear controller 140 may still be configured to receive the one or more first signals from the first position sensor 131, and, on the basis of the one or more first signals, control movement of the landing gear 121 by controlling operation of the landing gear movement system 122. In some such examples, the third position sensor 133 may also be omitted.

The landing gear controller 140 may comprise a receiver 142, a determiner 144, and a sender 146, as will be described in more detail below and as is shown in FIG. 1. The determiner 144 may be communicably connected to the receiver 142 and to the sender 146. The landing gear controller 140, or at least the determiner 144 thereof, may comprise a processor, such as a microprocessor.

Figure 4:
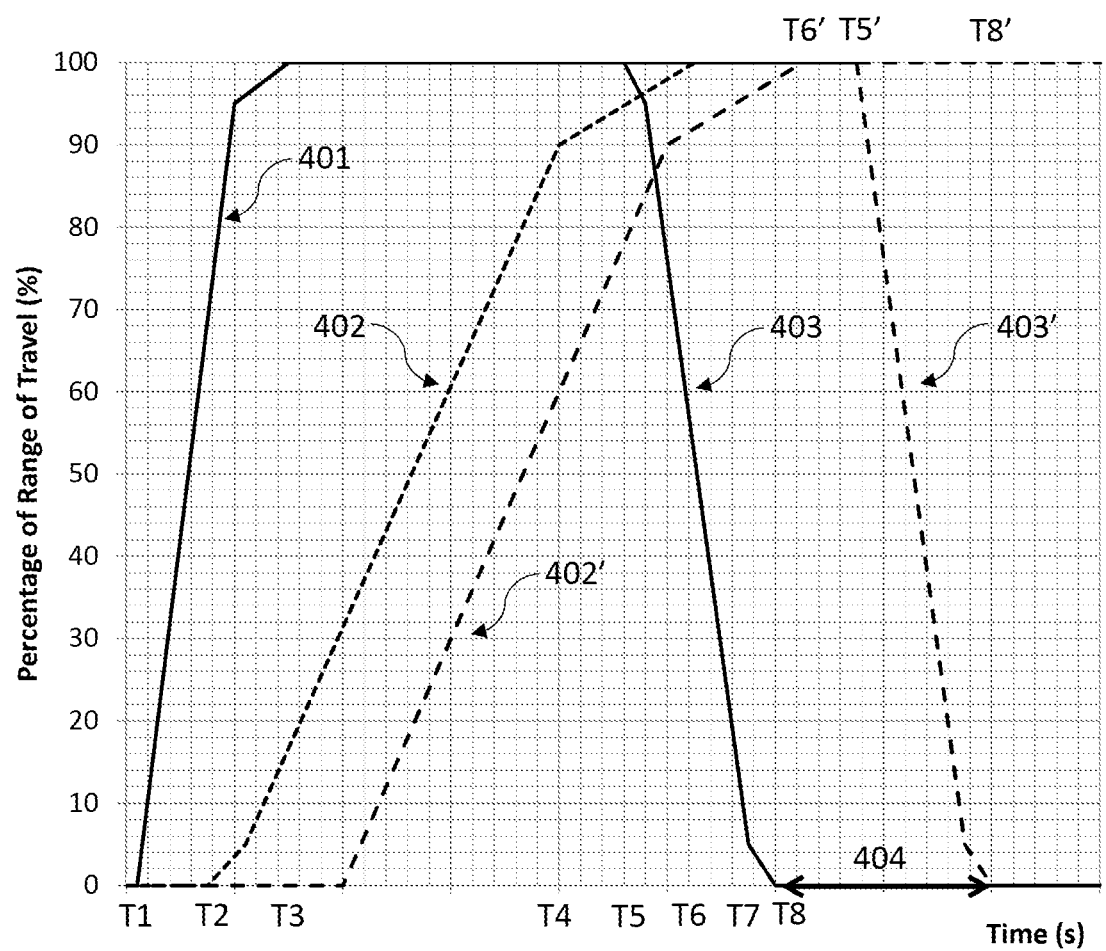
FIG. 4 is a graph comparing a landing gear retraction process with a comparative landing gear retraction process.

An example landing gear retraction process will now be described with reference to FIGS. 1 and 4. FIG. 4 is a graph comparing the landing gear retraction process with a comparative landing gear retraction process.

Initially, the landing gear 121 is at the extended position shown in dashed lines in FIG. 1, and the landing gear bay door 111 is at the closed position shown in solid lines in FIG. 1.

In response to receipt at the landing gear controller 140 (such as at the receiver 142 thereof) of a suitable command via a communication link 151 from cockpit flight controls 150, the landing gear controller 140 controls movement of the landing gear bay door 111 from the closed position to the open position by controlling operation of the landing gear bay door movement system 110. More specifically, at time T1 in FIG. 4, the landing gear controller 140 initiates, or causes commencement of, movement of the landing gear bay door 111 from the closed position. For example, the determiner 144 of the landing gear controller 140 may be configured to determine one or more instructions for controlling movement of the landing gear bay door 111, and the sender 146 may be configured to send the one or more instructions to the landing gear bay door movement system 112. Movement of the landing gear bay door 111 from the closed position to the open position is depicted by line 401 in FIG. 4.

The landing gear controller 140 receives one or more first signals from the first position sensor 131 during this movement of the landing gear bay door 111 from the closed position. The one or more first signals are received at the receiver 142 and indicate the position of the landing gear bay door 111, such as relative to the landing gear bay 115 or relative to the range of travel 113. At time T2 in FIG. 4, the landing gear bay door 111 is part way through its range of travel. More specifically, in this example, at time T2 the landing gear bay door 111 has covered approximately 95% of its range of travel from the closed position to the open position. In other examples this percentage may be different, such as another value in the range of 50% to 99% or in the range of 70% to 98%.

On the basis of the one or more first signals, the landing gear controller 140 is configured to control movement of the landing gear 121 from the extended position towards the retracted position by controlling operation of the landing gear movement system 122. More specifically, the determiner 144 of the landing gear controller 140 may be configured to determine one or more instructions for controlling movement of the landing gear 121, on the basis of the one or more first signals received at the receiver 142, and the sender 146 may be configured to send the one or more instructions to the landing gear movement system 122.

Movement of the landing gear 121 from the extended position to the retracted position is depicted by line 402 in FIG. 4.

For example, the determiner 144 may be configured to initiate, or cause commencement of, movement of the landing gear 121 from the extended position towards the retracted position, when the determiner 144 determines that the landing gear bay door 111 is at a position that leaves clear a path for movement of the landing gear 121 from the extended position to the retracted position. In some examples, the landing gear controller is configured, in use, to determine a relative position of the landing gear bay door 111 and the landing gear 121 on the basis of the one or more first signals and the one or more second signals, and to control the movement of the landing gear 121 on the basis of the relative position determined.

Alternatively, as mentioned above, the first position sensor 131 may be configured, in use, to continuously or repeatedly sense the position of the landing gear bay door 111 and continuously or repeatedly output one or more first signals indicative of the position of the landing gear bay door 111 for receipt by the receiver 142 of the landing gear controller 140. The landing gear controller 140 (such as the determiner 144 thereof) may be configured to determine a speed of movement of the landing gear bay door 111 along a path, on the basis of the one or more first signals continuously or repeatedly output by the first position sensor 131 and received at the receiver 142. The landing gear controller 140 (such as the determiner 144 thereof) may be configured to control the movement of the landing gear 121 by controlling operation of the landing gear movement system 122, on the basis of the speed of movement determined. For example, the determiner 144 may be configured to initiate, or cause commencement of, movement of the landing gear 121 from the extended position towards the retracted position, when the determiner 144 determines, on the basis of the determined speed of movement of the landing gear bay door 111, that the landing gear 121 will not contact the landing gear bay door 111 during movement of the landing gear 121 from the extended position to the retracted position. That is, the determiner 144 may be configured to determine, on the basis of the determined speed of movement of the landing gear bay door 111, that the landing gear bay door 111 will have cleared the path of the landing gear 121 by the time the landing gear 121 reaches a position that intersects the path of the landing gear bay door 111.

Accordingly, in this example, the landing gear controller 140 is configured to initiate, or cause commencement of, movement of the landing gear 121 from the extended position towards the retracted position at time T2, which is before the landing gear bay door 111 has reached the fully open position at time T3.

As can be seen from FIG. 4, in this example movement of the landing gear 121 from the extended position towards the retracted position begins at T2 at a relatively low first rate, and then proceeds at a higher second rate. In some examples, the landing gear controller 140 is configured to vary the speed of movement of the landing gear 121 by suitably controlling operation of the landing gear movement system 122, on the basis of the one or more first signals indicative of the position of the landing gear bay door 111. For example, the landing gear controller 140 may control an actuation rate of the one or more rate-controllable actuators 124 of the landing gear movement system 122. More specifically, the determiner 144 of the landing gear controller 140 may be configured to determine one or more instructions for causing movement of the landing gear 121, and the sender 146 may be configured to then send the one or more instructions to the landing gear movement system 122 to cause the movement.

In some examples, the landing gear controller 140 is configured to vary the speed of movement of the landing gear 121 on the basis of a position or speed of movement of the landing gear bay door 111. As discussed above, the landing gear controller 140 (such as the determiner 144 thereof) may determine the position or speed of movement of the landing gear bay door 111 on the basis of the one or more first signals continuously or repeatedly output by the first position sensor 131 and received at the receiver 142. In some cases, the landing gear controller 140 (such as the determiner 144 thereof) is configured to repeatedly determine the position or speed of movement of the landing gear bay door 111, and to repeatedly vary the speed of movement of the landing gear 121 accordingly.

Accordingly, the determiner 144 may be configured to initiate, or cause commencement of, movement of the landing gear 121 from the extended position towards the retracted position relatively slowly, such as when the landing gear bay door 111 is remote from the landing gear 121 but is still occupying a part of the path of the landing gear 121. The determiner 144 may also be configured to cause an increase in the rate of movement of the landing gear 121, when the determiner 144 determines, on the basis of the speed of movement of the landing gear bay door 111, that the landing gear bay door 111 will have cleared the path of the landing gear 121 by the time the landing gear 121 reaches a position that intersects the path of the landing gear bay door 111.

The landing gear bay door 111 subsequently reaches the open position at time T3, and the landing gear controller 140 causes cessation of movement of the landing gear bay door 111. For example, the determiner 144 of the landing gear controller 140 may be configured to determine one or more instructions for ceasing movement of the landing gear bay door 111, and the sender 146 may be configured to send the one or more instructions to the landing gear bay door movement system 112. Alternatively, the landing gear bay door 111 or part of the landing gear bay door movement system 112 may simply contact a mechanical stop.

It will be noted from FIG. 4, therefore, that in this example both the landing gear bay door 111 and the landing gear 121 are caused to move between times T2 and T3. Accordingly, movement of the landing gear 121 from the extended position is started earlier than in the comparative landing gear retraction process, in which movement of the landing gear 121 from the extended position is started after the landing gear bay door 111 has reached the open position at time T3. Movement of the landing gear 121 from the extended position to the retracted position in the comparative landing gear retraction process is depicted by line 402' in FIG. 4.

Although not necessarily the case in all examples, a speed of movement of the landing gear bay door 111 may be less between the times T2 and T3 than between the times T1 and T2, as shown in FIG. 4. This may help to lessen a shock experienced by the landing gear bay door 111 when it reaches the open position, and may also help to lessen a load on the power supply that supplies power simultaneously to the landing gear bay door movement system 112 and the landing gear movement system 122 during this period. This may be achieved by the provision of a snubbing system, as will be known and understood to the skilled person. Alternatively, in some examples, the landing gear controller 140 may be configured to control the movement of the landing gear bay door 111, by suitably controlling operation of the landing gear bay door movement system 112 on the basis of the one or more first signals, such that the movement is slowed. More specifically, the determiner 144 of the landing gear controller 140 may be configured to determine one or more instructions for causing slowed movement of the landing gear bay door 111, on the basis of the one or more first signals received at the receiver 142. The one or more first signals may indicate that the landing gear bay door 111 has reached a predetermined position or a predetermined percentage of its range of travel from the closed position to the open position, such as 95% or another value in the range of 50% to 99% or in the range of 70% to 98%. The sender 146 may be configured to then send the one or more instructions to the landing gear bay door movement system 112 to cause the slowed movement. In some examples, the landing gear controller 140 is configured, in use, to vary the speed of movement of the landing gear bay door 111 by controlling an actuation rate of the one or more rate-controllable actuators 114 of the landing gear bay door movement system 112.

The time of initiation, or commencement, of movement of the landing gear 121 from the extended position may be T2, as shown in FIG. 4. In other examples, the time of initiation, or commencement, of movement of the landing gear 121 from the extended position may be before or after T2. However, preferably it is on or after T2, so that a load on the (e.g. electrical or hydraulic) power supply that supplies power simultaneously to the landing gear bay door movement system 112 and the landing gear movement system 122 is lessened as compared to a situation in which the landing gear bay door 111 is being driven to move between its positions at the times T2 and T3 at the same higher rate of movement as between the times T1 and T2. Moreover, preferably the time of initiation, or commencement, of movement of the landing gear 121 from the extended position is before the time T3 at which the landing gear bay door 111 is fully open, so as to enable a reduction in overall time to complete the landing gear retraction process. In some examples, the initiation, or commencement, of movement of the landing gear 121 from the extended position may itself cause the slowed movement of the landing gear bay door 111 between times T2 and T3, since the demand of the landing gear movement system 122 on the power supply could reduce the power available from the power supply to simultaneously operate the landing gear bay door movement system 112.

The landing gear controller 140 receives one or more second signals from the second position sensor 132 during the movement of the landing gear 121 from the extended position. The one or more second signals are received at the receiver 142 and indicate the position of the landing gear 121, such as relative to the landing gear bay 115 or relative to the range of travel 123. At time T5 in FIG. 4, the landing gear 121 is part way through its range of travel. More specifically, in this example, at time T5 the landing gear 121 has covered approximately 95% of its range of travel from the extended position to the retracted position. In other examples this percentage may be different, such as another value in the range of 50% to 99% or in the range of 70% to 98%.

On the basis of the one or more second signals, the landing gear controller 140 is configured to control movement of the landing gear bay door 111 from the open position towards the closed position by controlling operation of the landing gear bay door movement system 112. More specifically, the determiner 144 of the landing gear controller 140 may be configured to determine one or more instructions for controlling movement of the landing gear bay door 111, on the basis of the one or more second signals received at the receiver 142, and the sender 146 may be configured to send the one or more instructions to the landing gear bay door movement system 112. Movement of the landing gear bay door 111 from the open position to the closed position is depicted by line 403 in FIG. 4.

For example, the determiner 144 may be configured to initiate, or cause commencement of, movement of the landing gear bay door 111 from the open position towards the closed position, when the determiner 144 determines that the landing gear 121 is at a position that leaves clear a path for movement of the landing gear bay door 111 from the open position to the closed position. In some examples, the landing gear controller is configured, in use, to determine a relative position of the landing gear bay door 111 and the landing gear 121 on the basis of the one or more first signals and the one or more second signals, and to control the movement of the landing gear bay door 111 on the basis of the relative position determined.

Alternatively, as mentioned above, the second position sensor 132 may be configured, in use, to continuously or repeatedly sense the position of the landing gear 121 and continuously or repeatedly output one or more second signals indicative of the position of the landing gear 121 for receipt by the receiver 142 of the landing gear controller 140. The landing gear controller 140 (such as the determiner 144 thereof) may be configured to determine a speed of movement of the landing gear 121 along a path, on the basis of the one or more second signals continuously or repeatedly output by the second position sensor 132 and received at the receiver 142. The landing gear controller 140 (such as the determiner 144 thereof) may be configured to control the movement of the landing gear bay door 111 by controlling operation of the landing gear bay door movement system 112, on the basis of the speed of movement determined. For example, the determiner 144 may be configured to initiate, or cause commencement of, movement of the landing gear bay door 111 from the open position towards the closed position, when the determiner 144 determines, on the basis of the determined speed of movement of the landing gear 121, that the landing gear bay door 111 will not contact the landing gear 121 during movement of the landing gear bay door 111 from the open position to the closed position. That is, the determiner 144 may be configured to determine, on the basis of the determined speed of movement of the landing gear 121, that the landing gear 121 will have cleared the path of the landing gear bay door 111 by the time the landing gear bay door 111 reaches a position that intersects the path of the landing gear 121.

Accordingly, in this example, the landing gear controller 140 is configured to initiate, or cause commencement of, movement of the landing gear bay door 111 from the open position towards the closed position at time T5, which is before the landing gear 121 has reached the fully retracted position at time T6.

As can be seen from FIG. 4, in this example movement of the landing gear bay door 111 from the open position towards the closed position begins at T5 at a relatively low first rate, and then proceeds at a higher second rate. In some examples, the landing gear controller 140 is configured to vary the speed of movement of the landing gear bay door 111 by suitably controlling operation of the landing gear bay door movement system 112, on the basis of the one or more second signals indicative of the position of the landing gear 121. For example, the landing gear controller 140 may control an actuation rate of the one or more rate-controllable actuators 114 of the landing gear bay door movement system 112. More specifically, the determiner 144 of the landing gear controller 140 may be configured to determine one or more instructions for causing movement of the landing gear bay door 111, and the sender 146 may be configured to then send the one or more instructions to the landing gear bay door movement system 112 to cause the movement.

In some examples, the landing gear controller 140 is configured to vary the speed of movement of the landing gear bay door 111 on the basis of a position or speed of movement of the landing gear 121. As discussed above, the landing gear controller 140 (such as the determiner 144 thereof) may determine the position or speed of movement of the landing gear 121 on the basis of the one or more second signals continuously or repeatedly output by the second position sensor 132 and received at the receiver 142. In some cases, the landing gear controller 140 (such as the determiner 144 thereof) is configured to repeatedly determine the position or speed of movement of the landing gear 121, and to repeatedly vary the speed of movement of the landing gear bay door 111 accordingly.

Accordingly, the determiner 144 may be configured to initiate, or cause commencement of, movement of the landing gear bay door 111 from the open position towards the closed position relatively slowly, such as when the landing gear 121 is remote from the landing gear bay door 111 but is still occupying a part of the path of the landing gear bay door 111. The determiner 144 may also be configured to cause an increase in the rate of movement of the landing gear bay door 111, when the determiner 144 determines, on the basis of the speed of movement of the landing gear 121, that the landing gear 121 will have cleared the path of the landing gear bay door 111 by the time the landing gear bay door 111 reaches a position that intersects the path of the landing gear 121.

The landing gear 121 subsequently reaches the retracted position at time T6, and the landing gear controller 140 causes cessation of movement of the landing gear 121. For example, the determiner 144 of the landing gear controller 140 may be configured to determine one or more instructions for ceasing movement of the landing gear 121, and the sender 146 may be configured to send the one or more instructions to the landing gear movement system 122. Alternatively, the landing gear 121 or part of the landing gear movement system 122 may simply contact a mechanical stop.

It will be noted from FIG. 4, therefore, that in this example both the landing gear bay door 111 and the landing gear 121 are caused to move between times T5 and T6. Accordingly, movement of the landing gear bay door 111 from the open position is started earlier than in the comparative landing gear retraction process, in which movement of the landing gear bay door 111 from the open position is started at time T5' (indicated at the top of FIG. 4), which is after the landing gear 121 has reached the retracted position at time T6'. Movement of the landing gear bay door from the open position to the closed position in the comparative landing gear retraction process is depicted by line 403' in FIG. 4.

Although not necessarily the case in all examples, a time T4 is between times T2 and T6, and a speed of movement of the landing gear 121 may be less between times T4 and T6 than between the times T2 and T4, as shown in FIG. 4. This may help to lessen a shock experienced by the landing gear 121 when it reaches the retracted position, and may also help to lessen a load on the power supply that supplies power simultaneously to the landing gear bay door movement system 112 and the landing gear movement system 122 during this period. This may be achieved by the provision of a snubbing system, as will be known and understood to the skilled person. Alternatively, in some examples, the landing gear controller 140 may be configured to control the movement of the landing gear 121, by suitably controlling operation of the landing gear movement system 122 on the basis of the one or more second signals, such that the movement is slowed. More specifically, the determiner 144 of the landing gear controller 140 may be configured to determine one or more instructions for causing slowed movement of the landing gear 121, on the basis of the one or more second signals received at the receiver 142. The one or more second signals may indicate that the landing gear 121 has reached a predetermined position or a predetermined percentage of its range of travel from the extended position to the retracted position, such as 95% or another value in the range of 50% to 99% or in the range of 70% to 98%. The sender 146 may be configured to then send the one or more instructions to the landing gear movement system 122 to cause the slowed movement. In some examples, the landing gear controller 140 is configured, in use, to vary the speed of movement of the landing gear 121 by controlling an actuation rate of the one or more rate-controllable actuators 124 of the landing gear movement system 122.

The time of initiation, or commencement, of movement of the landing gear bay door 111 from the open position may be after T4, as shown in FIG. 4. In other examples, the time of initiation, or commencement, of movement of the landing gear bay door 111 from the open position may be at T4. However, preferably it is on or after T4, so that a load on the (e.g. electrical or hydraulic) power supply that supplies power simultaneously to the landing gear bay door movement system 112 and the landing gear movement system 122 is lessened as compared to a situation in which the landing gear 121 is being driven to move between its positions at the times T4 and T6 at the same higher rate of movement as between the times T2 and T4. Moreover, preferably the time of initiation, or commencement, of movement of the landing gear bay door 111 from the open position is before the time T6 at which the landing gear 121 is fully retracted, so as to enable a reduction in overall time to complete the landing gear retraction process. In some examples, the initiation, or commencement, of movement of the landing gear bay door 111 from the open position may itself cause the slowed movement of the landing gear 121 between times T4 and T6, since the demand of the landing gear bay door movement system 112 on the power supply could reduce the power available from the power supply to simultaneously operate the landing gear movement system 122.

The landing gear bay door 111 subsequently reaches the closed position at time T8, and the landing gear controller 140 causes cessation of movement of the landing gear bay door 111. For example, the determiner 144 of the landing gear controller 140 may be configured to determine one or more instructions for ceasing movement of the landing gear bay door 111, and the sender 146 may be configured to send the one or more instructions to the landing gear bay door movement system 112.

A time T7 is between times T5 and T8, and a speed of movement of the landing gear bay door 111 may be less between times T7 and T8 than between the times T5 and T7, as shown in FIG. 4. This may help to lessen a shock experienced by the landing gear bay door 111 when it reaches the closed position. Again, this may be achieved by the provision of a snubbing system, as will be known and understood to the skilled person. Alternatively, in some examples, the landing gear controller 140 may be configured to control the movement of the landing gear bay door 111, by suitably controlling operation of the landing gear bay door movement system 112 on the basis of one or more first signals output by the first position sensor 131 during closing of the landing gear bay door 111, such that the movement is slowed. More specifically, the determiner 144 of the landing gear controller 140 may be configured to determine one or more instructions for causing slowed movement of the landing gear bay door 111, on the basis of the one or more first signals received at the receiver 142. The one or more first signals may indicate that the landing gear bay door 111 has reached a predetermined position or a predetermined percentage of its range of travel from the open position to the closed position, such as 95% or another value in the range of 50% to 99% or in the range of 70% to 98%. The sender 146 may be configured to then send the one or more instructions to the landing gear bay door movement system 112 to cause the slowed movement. In some examples, the landing gear controller 140 is configured, in use, to vary the speed of movement of the landing gear bay door 111 by controlling an actuation rate of the one or more rate-controllable actuators 114 of the landing gear bay door movement system 112.

It will be seen from FIG. 4 that, in the comparative process, the landing gear bay door reaches the closed position at time T8', which is after the time T8 at which the landing gear bay door 111 reaches the closed position in the present example. That is, the present example enables a reduction in overall time to complete the landing gear retraction process. This reduction in time is indicated at 404 in FIG. 4.

As noted above, the reduction in time results from (a) the initiation, or commencement, of movement of the landing gear 121 from the extended position towards the retracted position at the time T2 before the landing gear bay door 111 has reached the fully open position at time T3, and (b) the initiation, or commencement, of movement of the landing gear bay door 111 from the open position towards the closed position at the time T5 before the landing gear 121 has reached the fully retracted position at time T6. However, in other examples, either (a) or (b) may be omitted, and still a reduction in overall time to complete the landing gear retraction process will result.

As noted above, the third position sensor 133 is configured, in use, to sense the relative position of the landing gear bay door 111 and the landing gear 121. In some examples, the landing gear controller 140 utilises the one or more third signals output by the third position sensor 133 as a safety feature. In some such examples, the receiver 142 of the landing gear controller 140 is configured to receive the one or more third signals, and the determiner 144 is configured to determine the one or more instructions for controlling movement of the landing gear bay door 111 and/or the landing gear 121 on the basis of the one or more third signals indicative of the relative position. For example, the determiner 144 may be configured to cause a delay or halt in movement of the landing gear bay door 111 and/or the landing gear 121, when the determiner 144 determines that movement of the landing gear bay door 111 and/or the landing gear 121 could otherwise cause a collision between the landing gear bay door 111 and the landing gear 121.

The first position sensor 131 may be omitted in some examples that include the second position sensor 132 and/or the third position sensor 133. The second position sensor 132 may be omitted in some examples that include the first position sensor 131 and/or the third position sensor 133. The third position sensor 133 may be omitted in some examples that include the first position sensor 131 and/or the second position sensor 132.

In some examples, such as those in which the third position sensor 133 is omitted, the receiver 142 of the controller 140 may be configured to receive one or more first signals from the first position sensor 131 indicative of a position of the landing gear bay door 111 when the landing gear bay door 111 is part way through its range of travel 113, and one or more second signals from the second position sensor 132 indicative of a position of the landing gear 121 when the landing gear 121 is part way through its range of travel 123. The determiner 144 of the controller 140 may be configured to determine a relative position of the landing gear bay door 111 and the landing gear 121 on the basis of the one or more first signals and the one or more second signals, and to determine the one or more instructions for controlling movement of the landing gear bay door 111 and/or the landing gear 121 on the basis of the relative position determined. For example, similarly to as discussed above, the determiner 144 may be configured to cause a delay or halt in movement of the landing gear bay door 111 and/or the landing gear 121, when the determiner 144 determines that movement of the landing gear bay door 111 and/or the landing gear 121 could otherwise cause a collision between the landing gear bay door 111 and the landing gear 121.

In some examples, the landing gear controller 140 (such as the receiver 142 thereof) is configured, in use, to receive one or more additional signals, and the landing gear controller 140 (such as the determiner 144 and sender 146 thereof) is configured, in use, to control the movement of the landing gear bay door 111 and/or the landing gear 121 on the basis of the one or more additional signals. For example, the one or more additional signals may be indicative of one or more of: a pitch of a landing gear bogie, a status of another landing gear and/or another landing gear bay door, a status of one or more aircraft engines, failure or a defect of an aircraft component or an aircraft system, and an aircraft crab angle.

For example, when the landing gear 121 comprises a landing gear bogie and the one or more additional signals (such as may be obtained from a bogie pitch sensor) are indicative of a pitch of the landing gear bogie, then the landing gear controller 140 may be configured to prevent movement of the landing gear 121 to the retracted position if the one or more additional signals indicate that the landing gear bogie is at a pitch that would or could cause the landing gear bogie to contact the landing gear bay door 111, or to potentially contact and damage a component in the landing gear bay 115, were the landing gear 121 to be fully retracted.

In some examples, the landing gear bay door 111 and the landing gear 121 are parts of a first main landing gear system on one lateral side of a centreline of the aircraft, and the one or more additional signals are indicative of a status of a landing gear bay door and/or a landing gear of a second main landing gear system on the other lateral side of the centreline of the aircraft. In some such examples, the landing gear controller 140 may be configured to control movement of the landing gear bay door 111 and/or the landing gear 121 such that the landing gear bay door 111 and/or the landing gear 121 are positioned in the same way as the landing gear bay door and/or the landing gear of the second main landing gear system. This may enable the aircraft to be provided with symmetry, which may aid its control.

In some examples, the landing gear bay door 111 and the landing gear 121 are parts of a nose landing gear system and the one or more additional signals are indicative of a status of a landing gear bay door and/or a landing gear of a main landing gear system. In some such examples, the landing gear controller 140 may be configured to control movement of the landing gear bay door 111 and/or the landing gear 121 such that the landing gear bay door 111 and/or the landing gear 121 of the nose landing gear system are opened or extended, respectively, only when the main landing gear has been extended and its door(s) has/have been closed. This is because, when the landing gear of the nose landing gear system is at least partially extended, it can create a wake that may cause turbulence that buffets the landing gear bay door 111 of the downstream main landing gear system. Avoiding the creation of such turbulence may lessen the chance of structural fatigue in the landing gear bay door 111, or enable the landing gear bay door 111 to be lighter.

In some examples, the landing gear bay door 111 and the landing gear 121 are parts of a first main landing gear system on one lateral side of a centreline of the aircraft, and the one or more additional signals are indicative of a status of one or more engines of the aircraft. In some such examples, the landing gear controller 140 may be configured to control movement of the landing gear bay door 111 and/or the landing gear 121 such that the landing gear bay door 111 and/or the landing gear 121 are positioned to counteract yaw caused by differences in thrust generated by the engines, which may aid control of the aircraft.

In some examples, the one or more additional signals are indicative of failure or a defect of an aircraft component or an aircraft system, such as a component or system of a landing gear or a landing gear bay door (such as the landing gear 121 or landing gear bay door 111, or another landing gear or landing gear bay door of the aircraft). In some examples, the one or more additional signals are indicative of an aircraft crab angle. Such indicated factor(s) may influence loading of one of the landing gear bay door 111 and the landing gear 121, and hence their speed of movement. Therefore, the method may comprise controlling movement of the other of the landing gear bay door 111 and the landing gear 121, on the basis of the one or more additional signals.

In the interests of brevity, an example landing gear extension process will not be described at length. However, it will be appreciated that, in some examples, a landing gear extension process may be the same at the process depicted in FIG. 4 and described above, or any variant thereof discussed herein, with the exception that the landing gear 121 is extended between times T2 and T6 rather than retracted. Again, a reduction in overall time to complete the landing gear extension process may correspondingly be enabled by (a) the initiation, or commencement, of movement of the landing gear 121 from the retracted position towards the extended position at the time T2 before the landing gear bay door 111 has reached the fully open position at time T3, and (b) the initiation, or commencement, of movement of the landing gear bay door 111 from the open position towards the closed position at the time T5 before the landing gear 121 has reached the fully extended position at time T6. However, in other examples, either (a) or (b) may be omitted, and still a reduction in overall time to complete the landing gear extension process will result.

Figure 2:
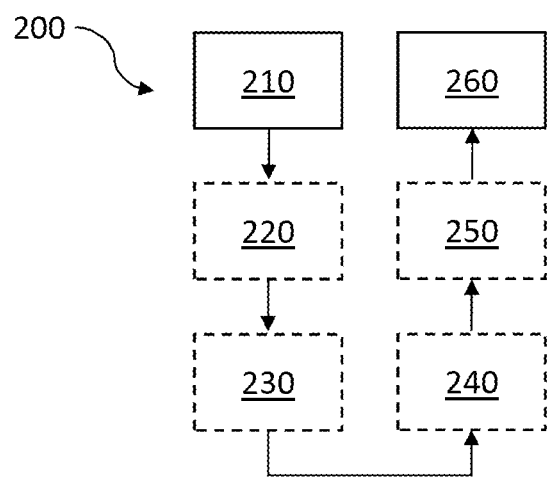
FIG. 2 is a flow diagram showing an example of a method of operating a landing gear controller for an aircraft.

Example methods of operating a landing gear controller for an aircraft will now be described with reference to FIG. 2. The landing gear controller 140 may be that which is depicted in FIG. 1 and described above with reference to FIGS. 1 and 4, or any variant thereof discussed herein, for example.

Broadly speaking, the method comprises the landing gear controller receiving 210 one or more signals from at least one position sensor, the one or more signals indicating a position of one of a landing gear bay door and a landing gear when the landing gear bay door or the landing gear, respectively, is part way through a range of travel between two limits of travel. The at least one position sensor may be the first and/or second position sensor 131, 132 described above, or any variant thereof discussed herein, for example. The landing gear bay door may be the landing gear bay door 111 described above, or any variant thereof discussed herein, for example. The landing gear may be the landing gear 121 described above, or any variant thereof discussed herein, for example.

The method also comprises the landing gear controller controlling 260 movement of the other of the landing gear bay door and the landing gear on the basis of the one or more signals. The controlling 260 may comprise initiating movement of the other of the landing gear bay door and the landing gear while the one of the landing gear bay door and the landing gear is part way through the range of travel.

In some examples, the controlling 260 comprises the landing gear controller varying a speed of movement of the other of the landing gear bay door and the landing gear on the basis of the one or more signals. In some examples, this comprises the landing gear controller controlling an actuation rate of one or more rate-controllable actuators of a landing gear bay door movement system or a landing gear movement system, respectively.

In some examples, the method comprises the landing gear controller receiving 220 one or more additional signals, and the controlling 260 is on the basis of the one or more additional signals. As discussed above, the one or more additional signals may, for example, be indicative of one or more of: a pitch of a landing gear bogie, a status of another landing gear or another landing gear bay door, and a status of an aircraft engine.

In some examples, the receiving 210 comprises the landing gear controller receiving the one or more signals continuously or repeatedly from the at least one position sensor. In some such examples, the method comprises the landing gear controller determining 230 a speed of movement of the landing gear bay door or the landing gear, respectively, along a path on the basis of the one or more signals continuously or repeatedly received from the at least one position sensor, and the controlling 260 comprises controlling the movement of the other of the landing gear bay door and the landing gear on the basis of the speed of movement determined.

In some examples, the at least one position sensor comprises: a landing gear bay door system position sensor that is configured to, when the landing gear bay door is part way through its range of travel, sense the position of the landing gear bay door and to output one or more first signals indicative of the position of the landing gear bay door, and a landing gear system position sensor that is configured to, when the landing gear is part way through its range of travel, sense the position of the landing gear and to output one or more second signals indicative of the position of the landing gear. In some such examples, the receiving 210 comprises receiving the one or more first signals and the one or more second signals. In some such examples, the method comprises the landing gear controller determining 240 a relative position of the landing gear bay door and the landing gear, on the basis of the one or more first signals and the one or more second signals, and the controlling 260 comprises controlling movement of the other of the landing gear bay door and the landing gear on the basis of the relative position determined.

In some examples, the method comprises the landing gear controller receiving 250 one or more third signals indicative of a relative position of the landing gear bay door and the landing gear, and the controlling 260 comprises controlling movement of the other of the landing gear bay door and the landing gear on the basis of the one or more third signals indicative of the relative position.

Figure 3:
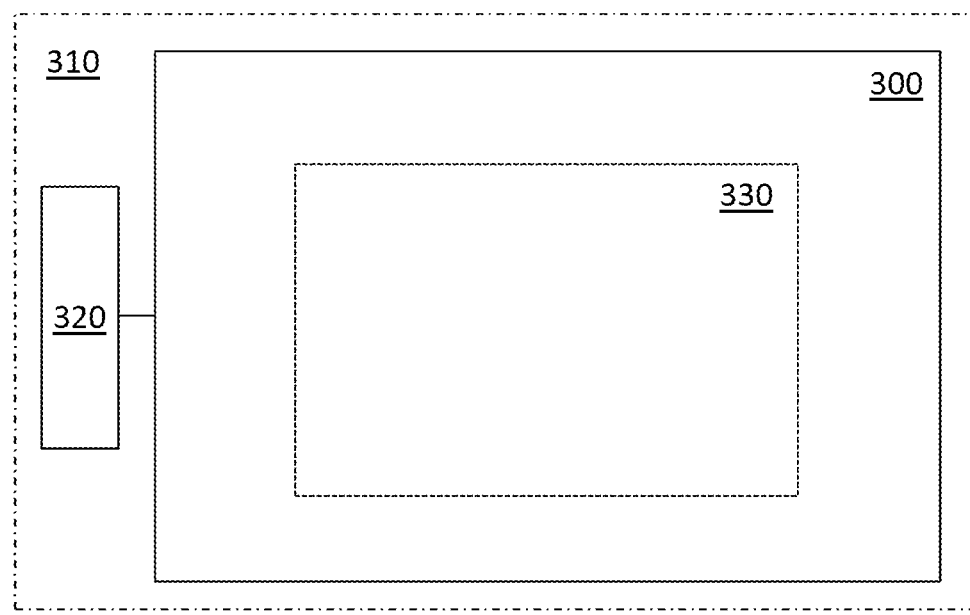
FIG. 3 shows a schematic view of an example of a non-transitory computer-readable storage medium.

FIG. 3 shows a schematic diagram of a non-transitory computer-readable storage medium 300 according to an example. The non-transitory computer-readable storage medium 300 stores instructions 330 that, if executed by a processor 320 of a landing gear controller 310 of an aircraft, cause the processor 320 to perform one of the methods described herein. In some examples, the landing gear controller 310 is the landing gear controller 140 described above with reference to FIG. 1 or any variant thereof described herein. In some examples, the processor 320 is the determiner 144 of the landing gear controller 140 described above with reference to FIG. 1 or any variant thereof described herein. The instructions 330 may comprise instructions to perform any of the methods 200 described above with reference to FIG. 2.

Figure 5:
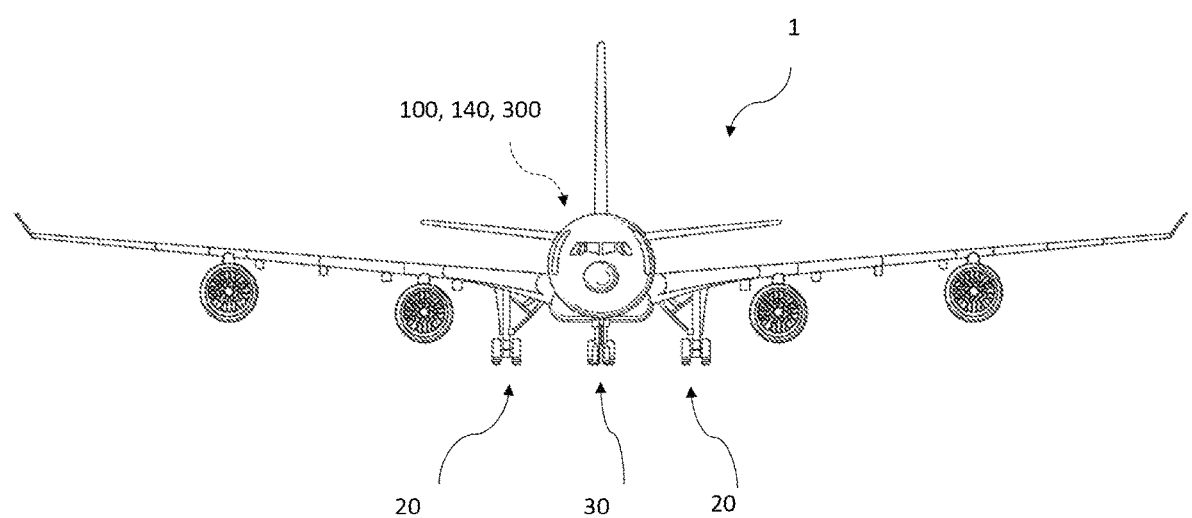
FIG. 5 shows a schematic front view of an aircraft.

FIG. 5 is a schematic front view of an aircraft 1. The aircraft 1 comprises two main landing gears 20 and a nose landing gear 30. The aircraft 1 also comprises the aircraft system 100 discussed herein with reference to FIG. 1, or any variant thereof discussed herein. The landing gear 121 of the aircraft system 100 may be one of the main landing gears 20 or the nose landing gear 30. The aircraft 1 also comprises the non-transitory computer-readable storage medium 300 discussed herein with reference to FIG. 3, or any variant thereof discussed herein. The aircraft 1 further comprises the landing gear controller 140 discussed herein with reference to FIG. 1, or any variant thereof discussed herein.

It is to noted that the term "or" as used herein is to be interpreted to mean "and/or", unless expressly stated otherwise.

The invention claimed is:

1. An aircraft system including:
a landing gear bay door,
a landing gear bay door movement system configured to move the landing gear bay door over a first range of travel between a closed position and an open position of the landing gear bay door, wherein the landing gear bay door at least partially covers a landing gear bay when in the closed position;
a landing gear, and
a landing gear movement system configured to move the landing gear over a second range of travel between an extended position and a retracted position of the landing gear, wherein the landing gear is at least partially positioned in the landing gear bay when in the retracted position;
a first position sensor configured to output a first signal indicating a first position of the landing gear bay door part way through the first range;
a second position sensor configured to output a second signal indicating a second position of a part of the landing gear part way through the second range, and
a landing gear controller communicably connected to the first position sensor and the second position sensor, and the landing gear controller operably connected to the landing gear bay door movement system and to the landing gear movement system, wherein the landing gear controller is configured, in use, to:
receive the first signal and the second signal, and
determine, based on the first signal and the second signal, a first relative position of the landing gear bay door relative to the landing gear or a second relative position of the landing gear relative to the landing gear bay door, and
actuate the landing gear movement system to control movement of the landing gear through the second range based on the first relative position or the second relative position, or
actuate the landing gear bay door movement system to control movement of the landing gear bay door through the first range based on the first relative position or the second relative position.

2. The aircraft system according to claim 1, wherein, the landing gear controller is further configured to, based on the first signal or the second signal, vary a speed of movement of the landing gear bay door or a speed of movement of the landing gear by controlling operation of the landing gear bay door movement system or the landing gear movement system, respectively.

3. The aircraft system according to claim 2, wherein the landing gear bay door movement system comprises one or more rate-controllable actuators operable to move the landing gear bay door through the first range, and the landing gear movement system comprises one or more rate-controllable actuators operable to move the landing gear through the second range;
wherein, based on the first signal or the second signal, the landing gear controller is configured to vary the speed of movement of the landing gear bay door or the speed of movement of the landing gear by controlling an actuation rate of the one or more rate-controllable actuators of the landing gear bay door movement system or the landing gear movement system, respectively.

4. The aircraft system according to claim 2, wherein the landing gear controller is configured to vary the speed of movement of the landing gear bay door based on the speed of movement of the landing gear or the second relative position, or
vary the speed of movement of the landing gear based on the first relative position or the speed of movement of the landing gear bay door.

5. The aircraft system according to claim 1, wherein:
the first position sensor continuously or repeatedly outputs the first signal as the first position sensor continuously or repeatedly senses the position of the landing gear bay door as the landing gear bay door is moving over the first range; and
the second position sensor continuously or repeatedly outputs the second signal as the second position sensor continuously or repeatedly senses the position of the part of the landing gear as the part of the landing gear is moving over the second range; and
wherein the landing gear controller is configured, in use, to receive the first signal and the updated second signal continuously or repeatedly output by the first position sensor and the second position sensor.

6. The aircraft system according to claim 1, wherein:
the landing gear controller is configured to:
determine a landing gear bay door speed of movement through the first range or a landing gear speed of movement through the second range based on the first signal or the second signal which are continuously or repeatedly output by the at least one position sensor; and control the movement of the landing gear bay door based on the landing gear bay door speed of movement, or the movement of the landing gear based on the landing gear speed of movement.

7. The aircraft system according to claim 1, wherein, the landing gear controller is further configured to initiate movement of the landing gear bay door or the landing gear by controlling operation of the landing gear bay door movement system or the landing gear movement system, respectively based on the first signal or the second signal.

8. The aircraft system according to claim 1, wherein the first position sensor or the second position sensor is configured to sense one or more of: an angular position, a linear position, and a curvilinear position of the landing gear bay door or the landing gear.

9. A method of operating a landing gear controller for an aircraft, the method comprising the landing gear controller:
receiving a first signal from at least one relative position sensor indicating a first relative position of a landing gear bay door relative to a landing gear or receiving a second signal from the relative position sensor indicating a second relative position of the landing gear relative to the landing gear bay door, wherein the at least one relative position sensor generates the first signal or the second signal as the landing gear bay door moves part way through a first range between a closed position and an open position and as the landing gear moves part way through a second range between a deployed position and a retracted position, and; and
actuate a landing gear movement system to control movement of the landing gear through the second range based on the first relative position or the second relative position, or
actuate a landing gear bay door movement system to control movement of the landing gear bay door through the first range based on the first relative position or the second relative position.

10. The method according to claim 9, further comprising:
receiving one or more additional signals, and
controlling the movement of the landing gear bay door or the landing gear based on the one or more additional signals.

11. The method according to claim 10, wherein the one or more additional signals are indicative of one or more of:
a pitch of a landing gear bogie,
a status of another landing gear or another landing gear bay door,
a status of one or more aircraft engines,
failure or a defect of an aircraft component or an aircraft system, and
an aircraft crab angle.

12. The method according to claim 9, further comprising initiating the movement of the landing gear bay door through the first range while the landing gear is part way in the second range or initiating movement of the landing gear through the second range the while the landing gear bay door is part way in the first range.

13. A non-transitory computer-readable storage medium storing instructions that, if executed by a processor, of the landing gear controller to cause the processor to carry out the method according to claim 9.

14. A landing gear controller for an aircraft, the landing gear controller comprising:
a receiver configured to receive, from at least one relative position sensor of an aircraft system, one or more signals indicative of a first relative position of a landing gear bay door relative to a landing gear while the landing gear bay door is part way along a first range between an open position and a closed position or a second relative position of the landing gear relative to the landing gear bay door while the landing gear is part way along a second range between a deployed position and a retracted position;
a processor configured to:
determine, based on the one or more signals, one or more instructions for controlling movement of the landing gear bay door while the landing gear is moving or the landing gear while the landing gear bay door is moving, and
send the one or more instructions to a movement system configured to move the landing gear bay door or the landing gear.

15. An aircraft, comprising the aircraft system according to claim 1.

16. The landing gear controller of 14, wherein the instructions control movement of the landing gear bay door to avoid a collision with the landing gear or movement of the landing gear to avoid collision with the landing gear.

17. The method of claim 9, further comprising:
sensing a position of the landing gear bay door in the first range with a first relative position sensor of the at least one relative position sensor, and
sensing a position of the landing gear relative in the second range with a second relative position sensor of the at least one relative position sensor.

18. The landing gear controller of claim 14, further comprising:
sensing a position of the landing gear bay door in the first range with a first position sensor, and
sensing a position of the landing gear relative in the second range with a second position sensor.

19. The aircraft system of claim 1, wherein the landing gear controller is configured to:
actuate the landing gear movement system control to simultaneously move the landing gear and the landing gear bay door, based on the first relative position or the second relative position.

20. The method of claim 9 further comprising:
actuating the landing gear movement system and the landing gear door movement system to simultaneously move the landing gear bay door and the landing gear.

21. The landing gear controller of claim 14, wherein the one or more instructions are to control simultaneous movements of the landing gear door and the landing gear.

* * * * *